United States Patent Office 3,122,572
Patented Feb. 25, 1964

3,122,572
AROMATIC RING-SUBSTITUTED STEROIDS AND PREPARATION THEREOF
Raymond O. Clinton, East Greenbush, N.Y., assignor to Sterling Drug Inc., New York, N.Y., a corporation of Delaware
No Drawing. Filed June 5, 1961, Ser. No. 114,653
33 Claims. (Cl. 260—397.1)

This invention relates to aromatic ring-substituted steroids, and in particular it is concerned with 4'-hydroxy-[benzo-1',2':2,3-steroids], with esters thereof, with intermediates therefor, and with the preparation thereof.

It has been found that new and useful compounds are produced when a benzene ring is fused to the 2- and 3-positions of a steroid, said benzene ring bearing a hydroxy or acyloxy group in position para to the 2-position of the steroid nucleus, and the steroid moiety having from seventeen to about twenty-three carbon atoms exclusive of ester radicals.

The ring structure of the compounds of the invention is represented by the following structure:

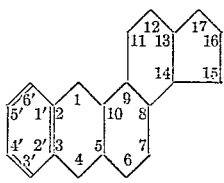

The exact nature of the steroid moiety is not critical, and it can be derived from any steroid of the general type known to exhibit hormonal or other pharmacological or endocrinological properties. Such steroid moieties have from seventeen to about twenty-three carbon atoms, not counting carbon content which may be provided by esterified hydroxy groups. Esterified hydroxy-steroids are included within the scope of the invention, but the carbon content contributed by the acid moiety of the ester is not considered part of the essential carbon content of the steroid.

The steroid moiety can be any member of the estrane, 18-norestrane, androstane, etiocholane, pregnane or allopregnane series. The foregoing can contain varying degrees of unsaturation and a variety of substituents in the form of hydrocarbon radicals or functional groups conventionally employed in the steroid art. Representative of the steroid moieties which make up the compounds of the invention are those having at position 17 a hydroxy, acyloxy, oxo, or both a hydroxy and a lower-alkyl radical, characteristic of the androgenic and anabolic steroids; or a lower-alkenyl, lower-alkynyl, acetyl, hydroxyacetyl, 1,2-dihydroxyethyl, 1-hydroxyethyl, and the like radicals, characteristic of the progestational and adrenal cortical steroids. The steroid moiety can also have one or more substituents at other positions of the nucleus, for example, hydroxy, acyloxy, or oxo radicals at positions 1-, 4-, 5-, 6-, 7-, 8-, 9-, 11-, 12-, 14-, 15- or 16- (the oxo groups being restricted to positions having secondary carbons); halogen atoms, preferably fluorine, chlorine or bromine, for example at the 1-, 4-, 5-, 6-, 7-, 8-, 9-, 11-, 12-, 14-, 15-, 16-, 17- or 21-positions; and one or more lower-alkyl groups, for example, at the 1-, 4-, 5-, 6-, 7-, 8-, 9-, 11-, 12-, 14-, 15- or 16-positions. The steroid moiety can also have one or more double bonds, especially at the 4,5- and/or 6,7-positions. The steroid moiety usually possesses angular methyl groups at $C_{19}$ and $C_{23}$, although 18- and 19-norsteroids and 18,19-bisnorsteroids, lacking one or both of the angular methyl groups at $C_{13}$ and $C_{10}$, respectively, are also representative steroids.

The 18,19-bisnorsteroid, 18- and 19-norsteroid and natural steroid moieties in the compounds of the invention contain, respectively, seventeen, eighteen and nineteen carbon atoms plus any carbon content which may be provided by one or more nuclearly substituted carbon containing radicals, up to and including a total of about twenty-three carbon atoms, exclusive of ester radicals.

When acyloxy radicals are present in the steroid moiety, or when the aromatic hydroxy group is esterified, the acyl radicals are preferably derived from carboxylic acids having from one to about ten carbon atoms, conventionally employed in the steroid art, and having a molecular weight less than about 200. Representative of the acyl radicals which can be present are lower-alkanoyl radicals, e.g., formyl, acetyl, propionyl, butyryl, isobutyryl, caproyl, heptanoyl, octanoyl, trimethylacetyl, and the like; carboxy-lower-alkanoyl radicals, e.g., succinyl (β-carboxypropionyl); cycloalkyl-lower-alkanoyl radicals, e.g., β-cyclopentylpropionyl, β-cyclohexylpropionyl, and the like; monocarbocyclic aroyl radicals, e.g., benzoyl p-toluyl, p-nitrobenzoyl, 3,4,5-trimethyloxybenzoyl, and the like; monocarbocyclic aryl-lower-alkanoyl or -alkenoyl radicals, such as phenylacetyl, β-phenylpropionyl, cinnamoyl, and the like; and monocarbocyclic aryloxy-lower-alkanoyl radicals, such as p-chlorophenoxyacetyl, and the like. Esters of inorganic acids, for instance, phosphoric acid, are also contemplated.

The compounds of the invention are prepared by the following sequence of reactions:

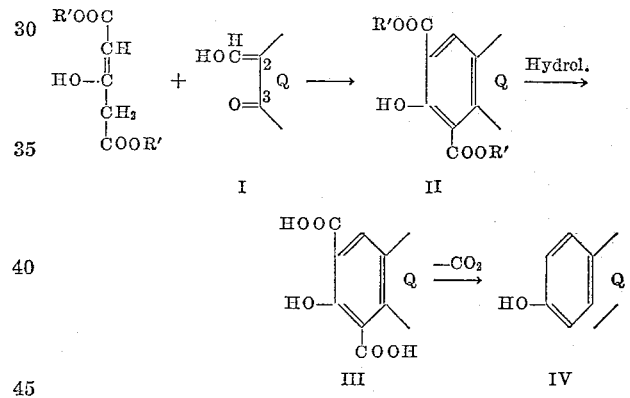

In the above formulas Q represents the remaining portion of the steroid moiety described above, and R is a lower-alkyl radical having from one to six carbon atoms. A 2-hydroxymethylene-3-oxo steroid (I) is condensed with a di-lower-alkyl acetonedicarboxylate to give a 3',5'-dicarbo - lower - alkoxy - 4' - hydroxy[benzo - 1',2':2,3 - steroid] (II). The latter is then hydrolyzed to the corresponding 3',5'-dicarboxy compound (III) and decarboxylated to a 4'-hydroxy[benzo-1',2':2,3-steroid] (IV).

The condensation between the 2-hydroxymethylene-3-oxo steroid and di-lower-alkyl acetonedicarboxylate is carried out by heating approximately equimolar quantities in an inert solvent in the presence of a strong base, for example, an alkali metal alkoxide, amide or hydride. The reaction takes place between about 50° C. and 150° C.

The hydrolysis to the dibasic acid II is carried out by heating the diester II with aqueous alkali or aqueous-alcoholic alkali, for example, an aqueous-methanolic solution of potassium hydroxide.

The decarboxylation of the dibasic acid III to produce the phenol IV is carried out by heating the dibasic acid in the presence of a basic substance. The basic substance can be an inorganic base, such as soda-lime or copper oxide, or an organic base such as a high-boiling amine. A preferred basic substance is a high-boiling amine, boiling above about 150° C., such as quinoline, collidine, and the like.

Compounds in which ring A of the steriod moiety is aromatic (estratriene compounds) can be prepared by dehydrogenation of the corresponding Δ⁴-19-nor-steroids by procedures well-known in other cases to aromatize ring A, as by heating with palladium-on-carbon catalyst:

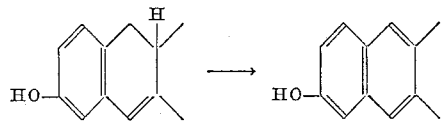

The intermediate 2-hydroxymethylene-3-oxo steroids (I) are prepared by condensing a 3-oxo steroid with a lower-alkyl formate in the presence of a strong base under anhydrous conditions. The strong base is preferably an alkali metal lower-alkoxide, amide or hydride. The 2-hydroxymethylene-3-oxo steroids are disclosed in my copending application Serial No. 793,292, filed February 16, 1959.

A particularly preferred group of compounds, derived from readily available starting materials, comprises those having the structural formula

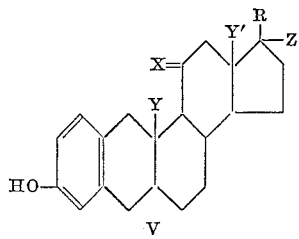

V wherein R is hydrogen or a lower-alkyl, lower-alkenyl, lower-alkynyl, the acetyl, the hydroxyacetyl, the 1,2-dihydroxyethyl or the 1-hydroxyethyl radical; X is selected from the group consisting of $H_2$, (H)(OH) and O; Y and Y' represent hydrogen or the methyl radical; and Z represents hydrogen or the hydroxy radical, Z being restricted to hydroxy when R represents hydrogen, or a lower-alkyl, lower-alkenyl or lower-alkynyl radical. Another preferred aspect of the invention includes compounds differing from V in having a further double bond in the 4,5-position (VI), or in both the 4,5-position and the 6,7-position (VII):

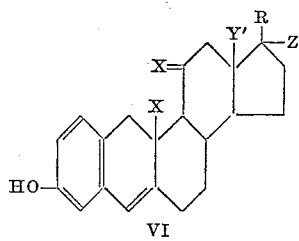

VI

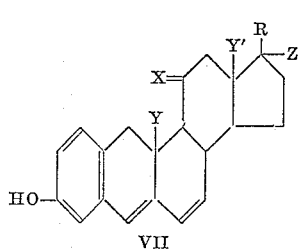

VII

The preferred aspects also include carboxylic acid esters of compounds of structures V, VI and VII. The phenolic hydroxy group, as well as any free hydroxy groups attached to the steroid nucleus or on the side chain at C–17, can be esterified.

The compounds of Formulas V, VI and VII, being phenols, are acidic in nature and form salts upon contacting them with bases, e.g., metal hydroxides, or water-soluble heavy metal salts in aqueous medium. Preferred salts are the alkali metal salts, e.g., sodium or potassium salts, although all metal salts are useful as intermediates in the purification of the free phenols. The salts are the equivalent of the free phenols specifically claimed.

In the above general Formulas V, VI and VII, R, when it represents a lower-alkyl, lower-alkenyl, or lower-alkynyl radical, has from one to about four carbon atoms and may be straight or branched, and thus includes such groups as methyl, ethyl, propyl, isopropyl, butyl, isobutyl, tertiary-butyl, vinyl, 1-propenyl, 2-propenyl, ethynyl, propargyl, and the like.

The compounds of Formulas V, VI and VII are prepared by reacting the appropriate 2-hydroxymethylene-3-oxo steroid, viz.:

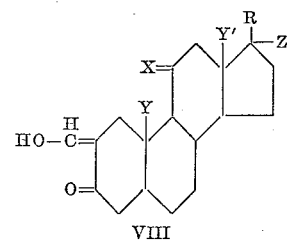

VIII or the corresponding compounds where double bonds are present in the 4,5- or the 4,5- and 6,7-positions, with a di-lower-alkyl acetonedicarboxylate followed by hydrolysis and decarboxylation of the resulting diester. R, X, Z, Y and Y' have the same meanings given above. When the steroid moiety contains oxo groups in addition to the one at position 3, these can be protected as ketal derivatives to prevent competing reactions. For example, when compounds in which R represents acetyl or hydroxyacetyl are desired, these radicals can be ketalized by known methods, e.g., with ethylene glycol, prior to introduction of the hydroxymethylene radical at the 2-position. It has been found, however, that 3,20-dioxo steroids bearing hydroxy groups at the 17- and 21-positions can be selectively formylated in the 2-position without need for protecting the 20-oxo group by ketalization. The ketal groups are readily cleaved by dilute acid. An oxo group at the 11-position is relatively unreactive and need not be protected. The ketals are the equivalent of the free oxo compounds specifically claimed.

An alternative method of preparing the 4'-hydroxy-[benzo-1',2':2,3-steroids] of the invention comprises aromatizing the corresponding 4'-oxo-1',4',5',6'-tetrahydrobenzo compounds, viz.:

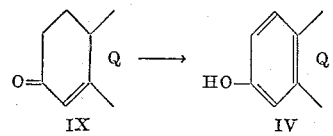

IX      IV

The aromatization is carried out by procedures known to convert cyclohexen-2-one derivatives to the corresponding phenols, as by heating with a dehydrogenating agent, for example, palladium-on-carbon, sulfur, selenium or the like; or by bromination followed by dehydrobromination.

The starting materials of Formula IX are in turn prepared by condensing an enamine derivative of a 3-oxo steriod with methyl vinyl ketone, as follows:

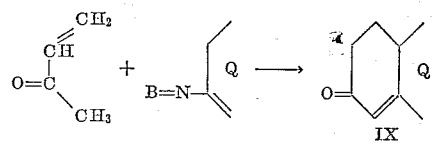

IX

B=N stands for a tertiary-amino radical, for example, di-lower-alkylamino, piperidino, pyrrolidino or morpholino. The condensation takes place by contacting the steroid enamine with methyl vinyl ketone in an inert solvent. The reaction takes place at ordinary temperatures.

A preferred class of 4'-oxo-1',4',5',6'-tetrahydrobenzo compounds, useful as starting materials for preparing 4'- hydroxy[benzo-1',2':2,3-steroids] are those having the formula

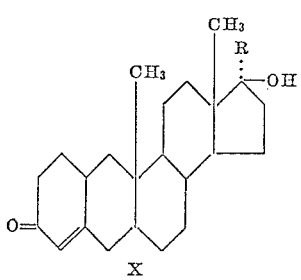

wherein R is lower-alkyl.

The present invention has provided new steroid compounds, namely 4'-hydroxy[benzo-1',2':2,3-steroids], and these compounds have now been made available for study of their endocrinological activities. Compounds of the invention have indeed been found to possess such activities as set forth below, and they are also useful as intermediates in the preparation of different species within the scope of the invention by introduction of new groups or alteration of groups already present in the steroid nucleus by known methods. For example, a 4'-hydroxy[benzo-1',2':2,3-steroids] having a hydroxy group in the 17-position of the steroid nucleus (V, VI or VII; R is H, Z is OH) can be oxidized to the corresponding 17-oxo compound. As another instance, a 4'-hydroxy[benzo-1',2':2,3-steroid] having a 1-hydroxyethyl radical in the 17-position (V, VI or VII; R is $CH_3CH(OH)—$, Z is H) can be oxidized to the corresponding 17-acetyl compound (V, VI or VII; R is $CH_3CO—$, Z is H). Many other alterations of the substituents on the steroid nucleus can be made by known methods without affecting the fused phenolic ring. It is also possible by the Birch reduction method (sodium or lithium in liquid ammonia) to convert the aromatic compounds of Formula IV to the hydroaromatic compounds of Formula IX.

Biological evaluation of the 4'-hydroxy[benzo-1',2':2,3-steroids] of the invention has shown that they possess endocrinological activity. In particular, they have been found to have estrogenic properties.

The structure of the compounds of the invention was established by the mode of synthesis, their ultraviolet and infrared spectra, and by the fact that the values found upon elementary analysis corresponded with the values calculated for the assigned structures.

The following examples will further illustrate the invention without the latter being limited thereby.

EXAMPLE 1

(a) *3',5'-Dicarbomethoxy-4',17β-Dihydroxy[Benzo-1',2':2,3-Androstane]*

Sodium metal (0.51 g., 0.022 mole) was dissolved in 200 ml. of methanol, and to this solution there was added 6.36 g. (0.020 mole) of 2-hydroxymethyleneandrostan-17β-ol-3-one and 4.0 g. (0.023 mole) of dimethyl acetonedicarboxylate. The reaction mixture was refluxed for three and one-half hours. Thereafter 2 ml. of acetic acid was added, the mixture heated to boiling and then cooled in ice. The precipitated product was collected by filtration, recrystallized from methanol and dried at 110° C. in vacuo for eight hours at give 3',5'-dicarbomethoxy-4,17β-dihydroxy[benzo-1',2':2,3-androstane], M.P. 204.8–206.2° C. (corr.), $[\alpha]_D^{25}=+66.2°$ (1% in chloroform); ultraviolet maxima at 247 and 320 mμ ($E=9,600$ and 5,300).

In the foregoing procedure it was found possible to employ commercial sodium methoxide instead of preparing it directly from metallic sodium. Likewise, it was found that 86% potassium hydroxide in tertiary-butyl alcohol could be used in place of the sodium methoxide.

(b) *3',5'-Dicarboxy-4',17β-Dihydroxy[Benzo-1',2':2,3-Androstane]*

A mixture of 11.30 g. of 3',5'-dicarbomethoxy-4',17β-dihydroxy[benzo-1',2':2,3-androstane] in the form of its sodium salt, 30 g. of potassium hydroxide, 100 ml. of water and 1000 ml. of methyl alcohol was refluxed with stirring for twenty-three hours. The reaction mixture was concentrated in vacuo, 800 ml. of water was added to the residue and the insoluble material removed by filtration. The filtrate was cooled with ice and acidified with concentrated hydrochloric acid, whereupon a gelatinous precipitate formed. The mixture was saturated with sodium chloride, extracted twice with ethyl acetate, and the extracts dried over anhydrous sodium sulfate and concentrated to a small volume. The product thus obtained was recrystallized from an acetone-n-hexane mixture and dried at 120° C. in vacuo for six hours to give 3',5'-dicarboxy-4',17β-dihydroxy[benzo-1',2':2,3-androstane] in the form of rosettes of colorless flattened needles, M.P. above 300° C. (corr.), $[\alpha]_D^{25}=+52.5°$ (1% in pyridine).

(c) *4',17β-Dihydroxy[Benzo-1',2':2,3-Androstane]*

[V; R is H, X is $H_2$, Z is OH, Y and Y' are $CH_3$]

A mixture of 10 g. of 3',5-dicarboxy-4',17β-dihydroxy-[benzo-1',2':2,3-androstane] and 60 ml. of quinoline was heated to about 228° C. over a period of about fifteen minutes, and then held at the boiling point (237° C.) for ten minutes. The reaction mixture was cooled to about 50° C. and poured into a mixture of ice and dilute hydrochloric acid. The precipitate formed was collected, dissolved in 400 ml. of benzene, and the solution was concentrated to a small volume to cause crystallization of the product. The product was recrystallized twice from acetone and dried at 120° C. in vacuo for twelve hours to give 4',17β-dihydroxy[benzo-1',2':2,3-androstane] in the form of colorless needles, M.P. 237.8–239.2° C. (corr.), $[\alpha]_D^{25}=+46.0°$ (1% in pyridine); ultraviolet maxima at 283 and 288 mμ ($E=2,337$ and $2,130$).

(d) *4',17β-Bis(β-Cyclohexylpropionoxy)[Benzo-1',2':2,3-Androstane]*

A mixture of 2.40 g. of 4',17β-dihydroxy[benzo-1',2':2,3-androstane], 8.8 g. of β-cyclohexylpropionic anhydride and 50 ml. of pyridine was held at room temperature for about twenty-two hours and then heated on a steam bath for two and one-quarter hours. The reaction mixture was added to 500 ml. of water, allowed to stand for one hour and then extracted three times with methylene dichloride. The extracts were washed with dilute sulfuric acid and concentrated sodium bicarbonate solution, dried over anhydrous sodium sulfate and concentrated to dryness. The residue was dissolved in 500 ml. of n-pentane and chromatographed on a column of 200 g. of silica gel. The column was eluted with n-pentane containing 5% ether, and the product recrystallized from n-hexane and dried at 90° C. in vacuo for five hours, to give 4',17β-bis(β-cyclohexylpropionoxy)[benzo-1',2':2,3-androstane] in the form of colorless needles, M.P. 147.8–148.8° C. (corr.), $[\alpha]_D^{25}=+29.8°$ (1% in chloroform).

Similarly to the procedure just described, 4',17β-dihydroxy[benzo-1',2':2,3-androstane] can be caused to react with acetic anhydride, propionic anhydride, caproyl chloride, succinic anhydride, β-cyclopentylpropionyl chloride, benzoyl chloride, p-nitrobenzoyl chloride, 3,4,5-trimethoxybenzoyl chloride, phenylacetyl chloride, cinnamoyl chloride, or p-chlorophenoxy-acetyl chloride, to give, respectively, 4',17β - diacetoxy[benzo-1',2':2,3-androstane], 4',17β-dipropionoxy[benzo-1',2':2,3-androstane], 4',17β-dicaproyloxy[benzo-1',2':2,3-androstane], 4',17β-bis(β-carboxypropionoxy)[benzo-1',2':2,3-androstane], 4',17β-bis(β - cyclopentylpropionoxy)[benzo - 1',2':2,3 - androstane] 4',17β-dibenzoyloxy[benzo-1',2':2,3-androstane], 4',17β - bis(p-nitrobenzoyloxy)[benzo - 1',2':2,3 - androstane], 4',17β-bis(3,4,5-trimethoxybenzoyloxy)[benzo-1', 2':2,3-androstane], 4',17β-bis(phenylacetoxy)[benzo-1', 2':2,3-androstane], 4',17β-dicinnamoyloxy[benzo-1',2':2, 3-androstane], or 4'17β-bis(4-chlorophenoxyacetoxy) [benzo-1',2':2,3-androstane].

4',17β-dihydroxy[benzo-1',2':2,3-androstane] is obtained in the form of its sodium or potassium salts when treated with an aqueous solution of sodium hydroxide or potassium hydroxide, respectively. 4',17β-dihydroxy [benzo-1',2':2,3-androstane] is obtained in the form of its copper, zinc or lead salts when an aqueous solution of its sodium salt is treated with an aqueous solution of cupric chloride, zinc chloride or lead nitrate, respectively.

4'-hydroxy-17-oxo[benzo-1',2':2,3-androstane] can be prepared by treating a solution of 4',17β-dihydroxy[benzo-1',2':2,3-androstane] in glacial acetic acid with a solution of chromic oxide in aqueous acetic acid. The product is isolated by the addition of water and collection of the resulting precipitate.

The compounds of the following examples were prepared according to the procedures described above in Example 1. In some instances the final product was purified by chromatographing it on aluminum oxide and eluting with benzene containing 20% of ether, or with benzene containing increasing amounts of ethyl acetate.

EXAMPLE 2

(a) 2-hydroxymethylene-17α-methylandrostan-17β-ol-3-one was condensed with dimethyl acetonedicarboxylate to give 3',5'-dicarbomethoxy-4',17β-dihydroxy-17α-methyl [benzo-1',2':2,3-androstane], M.P. 236.0–251.6° C. (corr.) (recrystallized from acetone), $[\alpha]_D^{25}=+46.0°$ (1% in chloroform); ultraviolet maxima at 248 and 320 mμ ($E$=9,700 and 5,400).

(b) 3',5'-dicarbomethoxy-4',17β-dihydroxy-17α-methyl [benzo-1',2':2,3-androstane] was saponified with potassium hydroxide in methanol to give 3',5'-dicarboxy-4',17β-dihydroxy-17α-methyl[benzo-1',2':2,3-androstane], M.P. 209.4–212.0° C. (corr.) (recrystallized from acetone), $[\alpha]_D^{25}=+35.4°$ (1% in pyridine).

(c) 3',5'-dicarboxy-4'-17β-dihydroxy-17α-methyl[benzo-1',2':2,3-androstane] was decarboxylated in quinoline to give 4',17β-dihydroxy-17α-methyl[benzo-1',2':2,3-androstane] [V; R is CH₃, X is H₂, Z is OH, Y and Y' are CH₃], pinkish needles, M.P. 211.0–218.4° C. (corr.), $$[\alpha]_D^{25}=+35.8°$$

(1% in chloroform); ultraviolet maxima at 222, 283 and 288 mμ ($E$=7,081, 2,334 and 2,124).

EXAMPLE 3

(a) 2-hydroxymethylene-17α-methyl-4-androsten-17β-ol-3-one was condensed with dimethyl acetonedicarboxylate to give 3',5'-dicarbomethoxy-4',17β-dihydroxy-17α methyl[benzo-1',2':2,3-androst-4-ene, colorless prisms, M.P. 238.0–247.0° C. (dec.) (corr.) (recrystallized from acetone), $[\alpha]_D^{25}=-15.0°$ (1% in chloroform); ultraviolet maxima at 223, 292, 302 and 342 mμ ($E$=17,900, 20,300, 21,000 and 9,900).

(b) 3',5'-dicarbomethoxy-4',17β-dihydroxy-17α-methyl [benzo-1',2':2,3-androst-4-ene] was saponified with potassium hydroxide in methanol to give 3',5'-dicarboxy-4',17β-dihydroxy-17α-methyl[benzo-1',2':2,3-androst-4-ene], colorless prisms, M.P. 224.8–226.8° C. (dec.) (corr.) (recrystallized from acetone), $[\alpha]_D^{25}=+31.2°$ (1% in pyridine).

(c) 3',5'-dicarboxy-4',17β-dihydroxy-17α-methyl [benzo-1',2':2,3-androst-4-ene] was decarboxylated in quinoline to give 4',17β-dihydroxy-17α-methyl[benzo-1',2':2,3-androst-4-ene] [VI; R is CH₃, X is H₂, Z is OH, Y and Y' are CH₃], pale yellow needles, M.P. 231.1–241.2° C. (corr.) (recrystallized from methanol)

$$[\alpha]_D^{25}=+117.0°$$

(1% in chloroform); ultraviolet maxima at 224, 229, 268, 279 and 305 mμ ($E$=25,600, 25,500, 12,100, 10,900 and 3,900); infrared maxima at 2.82, 2.97, 3.11, 3.44, 6.11, 6.24, 6.34, 6.65–6.68 and 6.90μ.

EXAMPLE 4

(a) 2-hydroxymethylene-17α-methyl-4,6-androstadien-17β-ol-3-one was condensed with dimethyl acetonedicarboxylate to give 3',5'-dicarbomethoxy-4',17β-dihydroxy-17α - methyl[benzo-1',2':2,3-androsta-4,6-diene], yellow leaves, M.P. 246.4–254.2° C. (corr.) (recrystallized from acetone), $[\alpha]_D^{25}=-351.6°$ (1% in chloroform); ultraviolet maxima at 237, 316, 329 and 359 mμ ($E$=13,347, 19,600, 21,000 and 15,700).

(b) 3',5'-dicarbomethoxy-4',17β-dihydroxy-17α-methyl [benzo-1',2':2,3-androsta-4,6-diene] was saponified with potassium hydroxide in methanol to give 3',5'-dicarboxy-4',17β-dihydroxy - 17α-methyl[benzo-1',2':2,3 - androsta-4,6-diene], M.P. 232–234° C. (dec.) (uncorr.) (recrystallized from acetone-hexane), $[\alpha]_D^{25}=-277°$ (1% in pyridine).

(c) 3',5'-dicarboxy-4',17β-dihydroxy-17α-methyl[benzo-1',2':2,3-androsta-4,6-diene] was decarboxylated in quinoline to give 4',17β-dihydroxy-17α-methyl[benzo-1',2':2,3-androsta-4,6-diene] [VII; R is CH₃, X is H₂, Z is OH, Y and Y' are CH₃], yellow needles, M.P. 246.4–254.6° C. (corr.) (recrystallized from methanol), $[\alpha]_D^{25}=-191°$ (1% in chloroform); ultraviolet maxima at 233, 241, 249, 293, 305 and 325 mμ ($E$=16,174, 16,835, 15,224, 23,665, 24,385 and 11,586).

EXAMPLE 5

(a) 2-hydroxymethylene-17α-ethynyl-4-androsten-17β-ol-3-one was condensed with dimethyl acetonedicarboxylate to give 3',5'-dicarbomethoxy-4',17β-dihydroxy-17α-ethynyl[benzo - 1',2':2,3 - androst-4-ene], M.P. 208.8–211.6° C. (corr.) (recrystallized from acetone-hexane), $[\alpha]_D^{25}=-96.2°$ (1% in chloroform); ultraviolet maxima at 223, 292, 302 and 340 mμ ($E$=18,139, 21,208, 21,539 and 9,961).

(b) 3',5'-dicarbomethoxy-4',17β-dihydroxy-17α-ethynyl [benzo-1',2':2,3-androst-4-ene] was saponified with potassium hydroxide in methanol to give 3',5'-dicarboxy-4',17β-dihydroxy - 17α-ethynyl[benzo-1',2':2,3 - androst-4-ene], M.P. 202.4–210° C. (dec.) (corr.) (recrystallized from methanol), $[\alpha]_D^{25}=-101.5°$ (1% in pyridine).

(c) 3',5'-dicarboxy-4',17β-dihydroxy-17α-ethynyl[benzo-1',2':2,3-androst-4-ene] was decarboxylated in quinoline to give 4',17β-dihydroxy-17α-ethynyl[benzo-1',2':2,3-androst-4-ene] [VI; R is C≡CH, X is H₂, Z is OH, Y' are CH₃], needles, M.P. 238.4–240.2° C. (corr.)(recrystallized from methanol), $[\alpha]_D^{25}=+37.4°$ (1% in chloroform); ultraviolet maxima at 224, 227, 260, 268, 278, 305 and 312 mμ ($E$=25,200, 25,000, 6,800, 11,900, 10,700, 3,800 and 3,400). The infrared absorption spectrum showed the presence of a triple bond at 4.29μ.

EXAMPLE 6

(a) 17,20;20,21 - bismethylenedioxy-2-hydroxymethylene-4-pregnene-3,11-dione was condensed with dimethyl acetonedicarboxylate to give 17,20;20,21-bismethylenedioxy - 3',5'-dicarbomethoxy-4'-hydroxy-11-oxo[benzo-1',2':2,3-pregn-4-ene], M.P. 273.2–276.0° C. (corr.) (recrystallized from acetone), $[\alpha]_D^{25}=+3.6°$ (1% in chloroform); ultraviolet maxima at 225, 291, 302, 342 and 352 mμ ($E$=18,000, 20,300, 20,600, 9,100 and 8,400).

(b) 17,20;20,21 - bismethylenedioxy - 3',5' - dicarbomethoxy - 4' - hydroxy-11-oxo[benzo-1',2':2,3-pregn-4-ene] was saponified with potassium hydroxide in methanol to give 17,20;20,21-bismethylenedioxy-3',5'-dicarboxy - 4' - hydroxy-11-oxo[benzo-1',2':2,3-pregn-4-ene], obtained in the form of a tan colored solid.

(c) 17,20;20,21 - bismethylenedioxy - 3',5' - dicarboxy - 4' - hydroxy-11-oxo[benzo-1',2':2,3-pregn-4-ene] was decarboxylated in quinoline to give 17,20;20,21-bismethylenedioxy-4'-hydroxy-11-oxo[benzo-1',2':2,3-pregn-4-ene], M.P. above 315° C. (recrystallized from benzene and dimethylformamide), $[\alpha]_D^{25} = +70.5°$ (1% in pyridine); ultraviolet maxima at 227, 231, 260, 268, 279, 306 and 318 m$\mu$ ($E$=26,800, 27,500, 880, 12,000, 11,000, 4,400 and 3,500).

(d) 4',17$\alpha$,21 - trihydroxy-11,20-dioxo[benzo-1',2':2,3-pregn-4-ene] [VI; R is COCH$_2$OH, X is O, Z is OH, Y and Y' are CH$_3$] was prepared by treating 3.1 g. of 17,20;20,21 - bismethylenedioxy-4'-hydroxy-11-oxo[benzo-1',2':2,3-pregn-4-ene] with 100 ml. of acetic acid and 10 ml. of 60% perchloric acid. After stirring the mixture for three days at room temperature, it was added to 500 ml. of water and partly neutralized with sodium carbonate. The mixture was filtered to give about 3 g. of solid product.

EXAMPLE 7

(a) 2 - hydroxymethylene-4-pregnen-20-ol-3-one was condensed with dimethyl acetonedicarboxylate to give 3',5' - dicarbomethoxy-4',20$\beta$-dihydroxy[benzo-1',2':2,3-pregn-4-ene], M.P. 177.8–180.2° C. (corr.) when recrystallized from benzene, $[\alpha]_D^{25} = -13.1°$ (1% in chloroform); ultraviolet maxima at 222, 291, 302 and 340 m$\mu$ ($E$=17,000, 19,400, 20,100 and 9,500).

(b) 3',5' - dicarbomethoxy - 4',20$\beta$-dihydroxy[benzo-1',2':2,3-pregn-4-ene] was saponified with sodium hydroxide in methanol to give 3',5'-dicarboxy-4',20$\beta$-dihydroxy[benzo-1',2':2,3-pregn-4-ene], M.P. 185–225° C., which was decarboxylated without further purification.

(c) 3',5' - dicarboxy-4',20$\beta$-dihydroxy[benzo-1',2':2,3-pregn-4-ene] was decarboxylated in quinoline to give 4',20$\beta$-dihydroxy[benzo-1',2':2,3-pregn-4-ene] [VI; R is CH(OH)CH$_3$, X is H$_2$, Z is H, Y and Y' are CH$_3$], M.P. 208.8–210.2° C. (corr.) when recrystallized from benzene, $[\alpha]_D^{25} = +113.3°$; ultraviolet maxima at 224, 229, 260, 268, 279, 304 and 311 m$\mu$ ($E$=24,600, 24,400 8,450, 11,600, 10,500, 3,900 and 3,390).

EXAMPLE 8

(a) 2 - hydroxymethylene-4-pregnene-3,20-dione 20-ethylene glycol ketal was condensed with dimethyl acetonedicarboxylate to give 3',5'-dicarbomethoxy-4'-hydroxy - 20-oxo[benzo-1',2':2,3-pregn-4-ene] 20-ethylene glycol ketal, M.P. 203–204.8° C. (corr.) (recrystallized from benzene), $[\alpha]_D^{25} = +82.3°$ (1% in chloroform); ultraviolet maxima at 223, 291, 302 and 340 m$\mu$ ($E$=20,900, 21,800, 22,400 and 10,500).

(b) 3',5' - dicarbomethoxy-4'-hydroxy-20-oxo[benzo-1',2':2,3-pregn-4-ene] 20-ethylene glycol ketal was saponified with sodium hydroxide in methanol to give 3',5'-dicarboxy - 4' - hydroxy-20-oxo[benzo-1',2':2,3-pregn-4-ene] 20-ethylene glycol ketal, M.P. 160–175° C. (uncorr.) (dec.).

(c) 3',5' - dicarboxy-4'-hydroxy-20-oxo[benzo-1',2':2,3-pregn-4-ene] 20-ethylene glycol ketal was decarboxylated in quinoline to give 4'-hydroxy-20-oxo[benzo-1',2':2,3-pregn-4-ene] 20-ethylene glycol ketal. This latter was dissolved in acetic acid and pyridine containing a little water, the solution concentrated on a hot plate, and the solid material which separated was recrystallized from pyridine to give 4'-hydroxy-20-oxo[benzo-1',2':2,3-pregn-4-ene] [VI; R is COCH$_3$, X is H$_2$, Z is H, Y and Y' are CH$_3$], M.P. 303–314° C. (uncorr.).

The following compounds can be prepared by the procedure described above in Example 1:

4',17$\beta$ - dihydroxy[benzo-1',2':2,3-androst-4-ene] [VI; R is H, X is H$_2$ Z is OH, Y and Y' are CH$_3$], by condensing 2 - hydroxymethylene-4-androsten-17$\beta$-ol-3-one with dimethyl acetonedicarboxylate, followed by saponifying and decarboxylating the intermediate 3',5'-dicarbomethoxy compound.

4',17$\beta$ - dihydroxy-17$\alpha$-ethyl[benzo-1',2':2,3-androst-4-ene] [VI; R is C$_2$H$_5$, X is H$_2$, Z is OH, Y and Y' are CH$_3$], by condensing 2-hydroxymethylene-17$\alpha$-ethyl-4-androsten-17$\beta$-ol-3-one with dimethyl acetonedicarboxylate, followed by saponifying and decarboxylating the intermediate 3',5'-dicarbomethoxy compound.

4',17$\beta$ - dihydroxy-17$\alpha$-vinyl[benzo-1',2':2,3-androst-4-ene] [VI; R is CH=CH$_2$, X is H$_2$, Z is OH, Y and Y' are CH$_3$], by condensing 2-hydroxymethylene-17$\alpha$-vinyl-4-androsten-17$\beta$-ol-3-one with dimethyl acetonedicarboxylate, followed by saponifying and decarboxylating the intermediate 3',5'-dicarbomethoxy compound.

4',17$\beta$ - dihydroxy-17$\alpha$-methyl[benzo-1',2':2,3-etiocholane] [V; R is CH$_3$, X is H$_2$, Z is OH, Y and Y' are CH$_3$ (rings A/B cis)], by condensing 2-hydroxymethylene - 17$\alpha$-methyletiocholan-17$\beta$-ol-3-one with dimethyl acetonedicarboxylate, followed by saponifying and decarboxylating the intermediate 3',5' - dicarbomethoxy compound.

4',17$\beta$ - dihydroxy-17$\alpha$-methyl[benzo-1',2':2,3-19-norandrostane] [V; R is CH$_3$, X is H$_2$, Z is OH, Y is H, Y' is CH$_3$], by condensing 2-hydroxymethylene-17$\alpha$-meththyl - 19-norandrostan-17$\beta$-ol-3-one with dimethyl acetonedicarboxylate, followed by saponifying and decarboxylating the intermediate 3',5'-dicarbomethoxy compound.

4',17$\beta$ - dihydroxy - 17$\alpha$-ethyl[benzo-1',2':2,3-androstane] [V; R is C$_2$H$_5$, X is H$_2$, Z is OH, Y and Y' are CH$_3$], by condensing 17$\alpha$-ethyl-2-hydroxymethyleneandrostan-17$\beta$-ol-3-one with dimethyl acetonedicarboxylate, followed by saponifying and decarboxylating the intermediate 3',5'-dicarbomethoxy compound.

4' - hydroxy-20-oxo[benzo-1',2':2,3-allopregnane] [V; R is COCH$_3$, X is H$_2$, Z is H, Y and Y' are CH$_3$ (rings A/B trans)], by condensing 2-hydroxymethyleneallopregnane-3,20-dione 20-ethylene glycol ketal with dimethyl acetonedicarboxylate, followed by saponifying and decarboxylating the intermediate 3',5'-dicarbomethoxy compound, and heating the resulting product with dilute acetic acid to cleave the ketal group.

4' - hydroxy-20-oxo[benzo-1',2':2,3-pregnane] [V; R is COCH$_3$, X is H$_2$, Z is H, Y and Y' are CH$_3$ (rings A/B cis)], by condensing 2-hydroxymethylenepregnane-3,20-dione 20-ethylene glycol ketal with dimethyl acetonedicarboxylate, followed by saponifying and decarboxylating the intermediate 3',5'-dicarbomethoxy compound, and heating the resulting product with dilute acetic acid to cleave the ketal group.

4',17$\beta$ - dihydroxy[benzo-1',2':2,3-androsta-4,6-diene] [VII; R is H, X is H$_2$, Z is OH, Y and Y' are CH$_3$], by condensing 2-hydroxymethylene-4,6-androstadien-17$\beta$-ol-3-one with dimethyl acetonedicarboxylate, followed by saponifying and decarboxylating the intermediate 3',5'-dicarbomethoxy compound.

4',17$\beta$ - dihydroxy - 17$\alpha$-ethyl[benzo-1',2':2,3-androsta-4,6-diene] [VII; R is C$_2$H$_5$, X is H$_2$, Z is OH, Y and Y' are CH$_3$], by condensing 2-hydroxymethylene-17$\alpha$-ethyl-4,6-androstadien-17$\beta$-ol-3-one with dimethyl acetonedicarboxylate, followed by saponifying and decarboxylating the intermediate 3',5'-dicarbomethoxy compound.

4',17$\beta$ - dihydroxy - 4,4,17$\alpha$ - trimethyl[benzo-1',2':2,3-17$\alpha$-trimethyl-5-androsten-17$\beta$-ol-3-one with dimethyl acetonedicarboxylate, followed by saponifying and decarboxylating the intermediate 3',5'-dicarbomethoxy compound.

4',17$\beta$ - dihydroxy - 4,4 - dimethyl[benzo - 1',2':2,3-androst-5-ene], by condensing 2-hydroxymethylene-4,4-dimethyl-5-androsten-17$\beta$-ol-3-one with dimethyl acetonedicarboxylate, followed by saponifying and decarboxylating the intermediate 3',5'-dicarbomethoxy compound.

4',17$\beta$ - dihydroxy - 4,4,17$\alpha$ - trimethyl[benzo-1',2':2,3-androstane], by condensing 2-hydroxymethylene-4,4,17$\alpha$-trimethylandrostan-17$\beta$-ol-3-one with dimethyl acetonedicarboxylate, followed by saponifying and decarboxylating the intermediate 3',5'-dicarbomethoxy compound.

4',17$\beta$ - dihydroxy - 6$\alpha$,17$\alpha$ - dimethyl[benzo-1',2':2,3-androst-4-ene], by condensing 2-hydroxymethylene-6$\alpha$,17$\alpha$-dimethyl-4-androsten-17$\beta$-ol - 3 - one with dimethyl acetonedicarboxylate, followed by saponifying and decarboxylating the intermediate 3',5'-dicarbomethoxy compound.

4',17β-dihydroxy - 17α - ethynyl[benzo-1',2':2,3-androstane] [V; R is C≡CH, X is H₂, Z is OH, Y and Y' are CH₃], by condensing 2-hydroxymethylene-17α-ethnyl-androstan-17β-ol-3-one with dimethyl acetonedicarboxylate, followed by saponifying and decarboxylating the intermediate 3',5'-dicarbomethoxy compound.

4',17β - dihydroxy - 17α - propargyl[benzo-1',2':2,3-androstane] [V; R is CH₂C≡CH, X is H₂, Z is OH, Y and Y' are CH₃], by condensing 2-hydroxymethylene-17α- propargylandrostan-17β-ol-3-one with dimethyl acetonedicarboxylate, followed by saponifying and decarboxylating the intermediate 3',5'-dicarbomethoxy compound.

4',20,21 - trihydroxy[benzo-1',2':2,3-pregn-4-ene] [VI; R is CH(OH)CH₂OH, X is H₂, Z is H, Y and Y' are CH₃], by condensing 2-hydroxymethylene-4-pregnene-20,21-diol-3-one with dimethyl acetonedicarboxylate, followed by saponifying and decarboxylating the intermediate 3',5'-dicarbomethoxy compound.

9 - fluoro - 4',11β,17α,21 - tetrahydroxy - 20-oxo[benzo-1',2':2,3-pregn-4-ene], by condensing 2-hydroxymethylene-9-fluoro-4-pregnene-11β,17α,21-triol - 3,20 - dione 20-monoethylene glycol ketal with dimethyl acetonedicarboxylate, followed by saponifying and decarboxylating the intermediate 3',5'-dicarbomethoxy compound, and heating the resulting product with dilute acetic acid to cleave the ketal group.

4',16α,17α,21 - tetrahydroxy - 20 - oxo - 9β,11β - oxido-[benzo-1',2':2,3-pregn-4-ene], by condensing 2-hydroxymethylene-4-pregnene-16α,17α,21 - triol - 3,20 - dione - 9β,11β-oxide 20-monoethylene glycol ketal with dimethyl acetonedicarboxylate, followed by saponifying and decarboxylating the intermediate 3',5'-dicarbomethoxy compound, and heating the resulting product with dilute acetic acid to cleave the ketal group.

4',17β - dihydroxy - 17α - propynyl - 6 - methyl[benzo-1',2':2,3-androst-4-ene], by condensing 2-hydroxymethylene-17α-propynyl-6-methyl-4-androsten-17β-ol-3-one with dimethyl acetonedicarboxylate, followed by saponifying and decarboxylating the intermediate 3',5'-dicarbomethoxy compound.

4',11β,17α,21 - tetrahydroxy - 20 - oxo[benzo - 1',2':2,3-pregn-4-ene] [VI; R is COCH₂OH, X is (H)(OH), Z is OH, Y and Y' are CH₃], by condensing 2-hydroxymethylene-4-pregnene-11β,17α,21-triol-3,20-dione 20-monoethylene glycol ketal with dimethyl acetonedicarboxylate, followed by saponifying and decarboxylating the intermediate 3',5'-dicarbomethoxy compound, and heating the resulting product with dilute acetic acid to cleave the ketal group.

4',17α,21 - trihydroxy - 11,20 - dioxo[benzo - 1',2':2,3-pregna-4,6-diene] [VII; R is COCH₂OH, X is O, Z is OH, Y and Y' are CH₃], by condensing 2-hydroxymethylene-4,6-pregnadiene-17α,21-diol-3,11,20-trione 20-monoethylene glycol ketal with dimethyl acetonedicarboxylate, followed by saponifying and decarboxylating the intermediate 3',5'-dicarbomethoxy compound, and heating the resulting product with dilute acetic acid to cleave the ketal group.

4',17α,21 - trihydroxy - 20 - oxo[benzo - 1',2':2,3-pregn-4-ene] [VI; R is COCH₂OH, X is H₂, Z is OH, Y and Y' are CH₃], by condensing 2-hydroxymethylene-4-pregnene-17α,21-diol-3,20-dione 20-monoethylene glycol ketal with dimethyl acetonedicarboxylate, followed by saponifying and decarboxylating the intermediate 3',5'-dicarbomethoxy compound, and heating the resulting product with dilute acetic acid to cleave the ketal group.

4',17α,21 - trihydroxy - 11,20 - dioxo - 6 - methyl[benzo-1',2':2,3-pregn-4-ene], by condensing 2-hydroxymethylene - 6 - methyl - 4 - pregnene - 17α,21 - diol - 3,11,20-trione 20-monoethylene glycol ketal with dimethyl acetonedicarboxylate, followed by saponifying and decarboxylating the intermediate 3',5'-dicarbomethoxy compound, and heating the resulting product with dilute acetic acid to cleave the ketal group.

4',17α,21 - trihydroxy - 11,20 - dioxo - 9 - fluoro - 6-methyl-[benzo-1',2':2,3-pregn-4-ene], by condensing 2-hydroxymethylene - 9 - fluoro - 6 - methyl - 4 - pregnene-17α,21-diol-3,11,20-trione 20-monoethylene glycol ketal with dimethyl acetonedicarboxylate, followed by saponifying and decarboxylating the intermediate 3',5'-dicarbomethoxy compound, and heating the resulting product with dilute acetic acid to cleave the ketal group.

4',11β,16α,17α,21 - pentahydroxy - 20 - oxo[benzo-1',2':2,3-pregn-4-ene], by condensing 2-hydroxymethylene - 4 - pregnene - 11β,16α,17α,21 - tetrol - 3,20 - dione 20-monoethylene glycol ketal with dimethyl acetonedicarboxylate, followed by saponifying and decarboxylating the intermediate 3',5'-dicarbomethoxy compound, and heating the resulting product with dilute acetic acid to cleave the ketal group.

4',16α,17α - 21 - tetrahydroxy - 11,20 - dioxo[benzo-1',2':2,3-pregn-4-ene], by condensing 2-hydroxymethylene - 4 - pregnene - 16α,17α,21 - triol - 3,11,20 - trione 20-monoethylene glycol ketal with dimethyl acetonedicarboxylate, followed by saponifying and decarboxylating the intermediate 3',5'-dicarbomethoxy compound, and heating the resulting product with dilute acetic acid to cleave the ketal group.

4',11β,21 - trihydroxy[benzo - 1',2':2,3 - pregna - 4,17(20)-diene], by condensing 2-hydroxymethylene-4,17(20)-pregnadiene-11β,21-diol-3-one with dimethylacetonedicarboxylate, followed by saponifying and decarboxylating the intermediate 3',5'-dicarbomethoxy compound.

4',6β,17β - trihydroxy[benzo - 1',2':2,3 - androstane], by condensing 2 - hydroxymethyleneandrostane - 6β,17β-diol-3-one with dimethyl acetonedicarboxylate, followed by saponifying and decarboxylating the intermediate 3',5'-dicarbomethoxy compound.

4',17β - dihydroxy - 17α - ethynyl - 11 - oxo[benzo-1',2':2,3-androst-4-ene] [VI; R is C≡CH, X is O, Z is OH, Y and Y' are CH₃], by condensing 2-hydroxymethylene-17α-ethynyl-4-androsten-17β-ol-3,11-dione with dimethyl acetonedicarboxylate, followed by saponifying and decarboxylating the intermediate 3',5'-dicarbomethoxy compound.

4',17β - dihydroxy - 17α - methyl - 11 - oxo[benzo - 1',2':2,3-androst-4-ene] [VI; R is CH₃, X is O, Z is OH, Y and Y' are CH₃], by condensing 2-hydroxymethylene-17α-methyl-4-androsten-17β-ol-3,11-dione with dimethyl acetonedicarboxylate, followed by saponifying decarboxylating the intermediate 3',5'-dicarbomethoxy compound.

4',17β - dihydroxy - 11 - oxo[benzo - 1',2':2,3 - androst-4-ene] [VI; R is H, X is O, Z is OH, Y and Y' are CH₃], by condensing 2-hydroxymethylene-4-androsten-17β-ol-3,11-dione with dimethyl acetonedicarboxylate, followed by saponifying and decarboxylating the intermediate 3',5'-dicarbomethoxy compound.

4',6β,17β - trihydroxy[benzo - 1',2':2,3 - androst - 4-ene], by condensing 2-hydroxymethylene-4-androstene-6β,17β-diol-3-one with dimethyl acetonedicarboxylate, followed by saponifying and decarboxylating the intermediate 3',5'-dicarbomethoxy compound.

4',6β,17β - trihydroxy - 17α - methyl[benzo - 1',2':2,3-androst-4-ene], by condensing 2-hydroxymethylene-17α-methyl-4-androstene-6β,17β-diol-3-one with dimethyl acetonedicarboxylate, followed by saponifying and decarboxylating the intermediate 3',5'-dicarbomethoxy compound.

4',14α,17β - trihydroxy[benzo - 1',2':2,3 - androst - 4-ene], by condensing 2-hydroxymethylene-4-androstene-14α,17β-diol-3-one with dimethyl acetonedicarboxylate, followed by saponifying and decarboxylating the intermediate 3',5'-dicarbomethoxy compound.

4',17β - dihydroxy - 16β - methyl[benzo - 1',2':2,3-androst-4-ene], by condensing 2-hydroxymethylene-16β-methyl-4-androsten-17β-ol-3-one with dimethyl acetonedicarboxylate, followed by saponifying and decarboxylating the intermediate 3',5'-dicarbomethoxy compound.

4',11α,17β - trihydroxy[benzo - 1',2':2,3 - androst - 4- ene] [VI; R is H, X is (H)(OH), Z is OH, Y and Y' are CH₃], by condensing 2-hydroxymethylene-4-androstene-11α,17β-diol-3-one with dimethyl acetonedicarboxylate, followed by saponifying and decarboxylating the intermediate 3',5'-dicarbomethoxy compound.

4',6β,17β - trihydroxy[benzo - 1',2':2,3 - 19 - norandrost-4-ene], by condensing 2-hydroxymethylene-19-nor-4-androstene-6β,17β-diol-3-one with dimethyl acetonedicarboxylate, followed by saponifying and decarboxylating the intermediate 3',5'-dicarbomethoxy compound.

4',17β - dihydroxy - 4 - methyl[benzo - 1',2':2,3 - androst-4-ene], by condensing 2-hydroxymethylene-4-methyl-4-androsten-17β-ol-3-one with dimethyl acetonedicarboxylate, followed by saponifying decarboxylating the intermediate 3',5'-dicarbomethoxy compound.

4',17β - dihydroxy - 4,17α - dimethyl[benzo - 1',2':2,3-androst-4-ene], by condensing 2-hydroxymethylene-4,17α-dimethyl-4-androsten-17β-ol-3-one with dimethyl acetonedicarboxylate, followed by saponifying and decarboxylating the intermediate 3',5'-dicarbomethoxy compound.

4',17β - dihydroxy - 17α - ethynyl[benzo - 1',2':2,3-androsta-4,6-diene] [VII; R is C≡CH, X is H₂, Z is OH, Y and Y' are CH₃] by condensing 2-hydroxymethylene-17α-ethynyl-4,6-androstadien-17β-ol-3-one with dimethyl acetonedicarboxylate, followed by saponifying and decarboxylating the intermediate 3',5'-dicarbomethoxy compound.

4',6β,17α,21 - tetrahydroxy - 20 - oxo[benzo - 1',2':2,3-allopregnane], by condensing 2-hydroxymethyleneallopregnane - 6β,17α,21 - triol - 3,20 - dione 20 - monoethylene glycol ketal with dimethyl acetonedicarboxylate, followed by saponifying and decarboxylating the intermediate 3',5'-dicarbomethoxy compound, and heating the resulting product with dilute acetic acid to cleave the ketal group.

4',12α,17α,21 - tetrahydroxy - 20 - oxo[benzo - 1',2':2,3-pregn-4-ene], by condensing 2-hydroxymethylene-4-pregnene - 12α,17α,21 - triol - 3,20 - dione 20 - monoethylene glycol ketal with dimethyl acetonedicarboxylate, followed by saponifying and decarboxylating the intermediate 3',5'-dicarbomethoxy compound, and heating the resulting product with dilute acetic acid to cleave the ketal group.

4',17α,21 - trihydroxy - 12,20 - dioxo[benzo - 1',2':2,3-allopregnane], by condensing 2-hydroxymethyleneallopregnane - 17α,21 - diol - 3,12,20 - trione 20 - monoethylene glycol ketal with dimethyl acetonedicarboxylate, followed by saponifying and decarboxylating the intermediate 3',5'-dicarbomethoxy compound, and heating the resulting product with dilute acetic acid to cleave the ketal group.

4' - hydroxy - 20 - oxo[benzo - 1',2':2,3 - pregna - 4,11-diene], by condensing 2-hydroxymethylene-4,11-pregnadiene-3,20-dione 20-monoethylene glycol ketal with dimethyl acetonedicarboxylate, followed by saponifying and decarboxylating the intermediate 3',5'-dicarbomethoxy compound, and heating the resulting product with dilute acetic acid to cleave the ketal group.

4',17α - dihydroxy - 20 - oxo[benzo - 1',2':2,3 - pregn-4-ene] [VI; R is COCH₃, X is H₂, Z is OH, Y and Y' are CH₃], by condensing 2-hydroxymethylene-4-pregnen-17α-ol-3,20-dione 20-monoethylene glycol ketal with dimethyl acetonedicarboxylate, followed by saponifying and decarboxylating the intermediate 3',5'-dicarbomethoxy compound, and heating the resulting product with dilute acetic acid to cleave the ketal group.

4' - hydroxy - 17α - methyl - 20 - oxo[benzo - 1',2':2,3-pregn-4-ene], by condensing 2-hydroxymethylene-17α-methyl - 4 - pregnene - 3,20 - dione 20 - monoethylene glycol ketal with dimethyl acetonedicarboxylate, follower by saponifying and decarboxylating the intermediate 3',5'-dicarbomethoxy compound, and heating the resulting product with dilute acetic acid to cleave the ketal group.

4',6β-dihydroxy - 20 - oxo[benzo-1',2':2,3-pregn-4-ene], by condensing 2-hydroxymethylene-4-pregnen-6β-ol-3,20-dione 20-monoethylene glycol ketal with dimethyl acetonedicarboxylate, followed by saponifying and decarboxylating the intermediate 3',5'-dicarbomethoxy compound, and heating the resulting product with dilute acetic acid to cleave the ketal group.

4',7β,11β-trihydroxy - 20 - oxo[benzo-1',2':2,3-pregn-4-ene], by condensing 2-hydroxymethylene-4-pregnene-7β,11β-diol-3,20-dione 20-monoethylene glycol ketal with dimethyl acetonedicarboxylate, followed by saponifying and decarboxylating the intermediate 3',5'-dicarbomethoxy compound, and heating the resulting product with dilute acetic acid to cleave the ketal group.

4',17α,21-trihydroxy - 12α - chloro-11,20-dioxo[benzo-1',2':2,3-pregn-4-ene], by condensing 2-hydroxymethylene-12α-chloro-4-pregnene-17α,21-diol-3,11,20-trione 20-monoethylene glycol ketal with dimethyl acetonedicarboxylate, followed by saponifying and decarboxylating the intermediate 3',5'-dicarbomethoxy compound, and heating the resulting product with dilute acetic acid to cleave the ketal group.

4'-hydroxy - 20 - oxo[benzo - 1',2':2,3 - 18,19 - bisnorpregn-4-ene] [VI; R is COCH₃, X is H₂, Z is H, Y and Y' are H], by condensing 2-hydroxymethylene-18,19-bisnor-4-pregnene-3,20-dione 20-monoethylene glycol ketal with dimethyl acetonedicarboxylate, followed by saponifying and decarboxylating the intermediate 3',5'-dicarbomethoxy compound, and heating the resulting product with dilute acetic acid to cleave the ketal group.

4',7α,12α-trihydroxy - 20 - oxo[benzo-1',2':2,3-pregn-4-ene], by condensing 2-hydroxymethylene-4-pregnene-7α,12α-diol-3,20-dione 20-monoethylene glycol ketal with dimethyl acetonedicarboxylate, followed by saponifying and decarboxylating the intermediate 3',5'-dicarbomethoxy compound, and heating the resulting product with dilute acetic acid to cleave the ketal group.

4'-hydroxy - 7,20 - dioxo[benzo-1',2':2,3-allopregnane], by condensing 2-hydroxymethyleneallopregnane-3,7,20-trione 7,20-bis-(ethylene glycol ketal) with dimethyl acetonedicarboxylate, followed by saponifying and decarboxylating the intermediate 3',5'-dicarbomethoxy compound, and heating the resulting product with dilute acetic acid to cleave the ketal group.

4',17β-dihydroxy - 6α,17α - dimethyl[benzo-1',2':2,3-androstane], by condensing 2-hydroxymethylene-6α,17α-dimethylandrostan-17β-ol-3-one with dimethyl acetonedicarboxylate, followed by saponifying and decarboxylating the intermediate 3',5'-dicarbomethoxy compound.

4',17β - dihydroxy-17α-propyl[benzo-1',2':2,3-androst-4-ene] [VI; R is (CH₂)₂CH₃, X is H₂, Z is OH, Y and Y' are CH₃], by condensing 2-hydroxymethylene-17α-propyl-4-androsten-17β-ol-3-one with dimethyl acetonedicarboxylate, followed by saponifying and decarboxylating the intermediate 3',5'-dicarbomethoxy compound.

4',17β-dihydroxy - 17α - allyl[benzo-1',2':2,3-androst-4-ene] [VI; R is CH₂CH=CH₂, X is H₂, Z is OH, Y and Y' are CH₃], by condensing 2-hydroxymethylene-17α-allyl-4-androsten-17β-ol-3-one with dimethyl acetonedicarboxylate, followed by saponifying and decarboxylating the intermediate 3',5'-dicarbomethoxy compound.

4',17β - dihydroxy - 17α - propargyl[benzo - 1',2':2,3-androst-4-ene] [VI; R is CH₂C≡CH, X is H₂, Z is OH, Y and Y' are CH₃], by condensing 2-hydroxymethylene-17α-propargyl-4-androsten-17β-ol-3-one with dimethyl acetonedicarboxylate, followed by saponifying and decarboxylating the intermediate 3',5'-dicarbomethoxy compound.

4',17β - dihydroxy - 17α - propynyl[benzo - 1',2':2,3-androst-4-ene] [VI; R is C≡CCH₃, X is H₂, Z is OH, Y and Y' are CH₃], by condensing 2-hydroxymethylene-17α-propynyl-4-androsten-17β-ol-3-one with dimethyl acetonedicarboxylate, followed by saponifying and decarboxylating the intermediate 3',5'-dicarbomethoxy compound.

4',17β-dihydroxy - 17α - propyl[benzo-1',2':2,3-androstane] [V; R is CH₂CH₂CH₃, X is H₂, Z is OH, Y and Y' are CH₃], by condensing 2-hydroxymethylene-17α-propylandrostan-17β-ol-3-one with dimethyl acetonedicarboxylate, followed by saponifying and decarboxylating the intermediate 3',5'-dicarbomethoxy compound.

4',17β-dihydroxy - 17α - methyl[benzo-1',2':2,3-19-norandrost-4-ene] [VI; R is CH₃, X is H₂, Z is OH, Y is H, Y' is CH₃], by condensing 2-hydroxymethylene-17α-methyl-19-nor-4-androsten-17β-ol-3-one with dimethyl acetonedicarboxylate, followed by saponifying and decarboxylating the intermediate 3',5'-dicarbomethoxy compound.

4',17β - dihydroxy - 17α - propynyl[benzo - 1',2':2,3-androstane] [V; R is C≡CCH₃, X is H₂, Z is OH, Y and Y' are CH₃], by condensing 2-hydroxymethylene-17α-propynylandrostan-17β-ol-3-one with dimethyl acetonedicarboxylate, followed by saponifying and decarboxylating the intermediate 3',5'-dicarbomethoxy compound.

4',11β,17α,21-tetrahydroxy - 9α - fluoro-20-oxo[benzo-1',2':2,3-pregn-4-ene], by condensing 2-hydroxymethylene-17,20;20,21-bismethylenedioxy - 9α - fluoro-4-pregnen-11β-ol-3-one with dimethyl acetonedicarboxylate, followed by saponifying and decarboxylating the intermediate 3',5'-dicarbomethoxy compound, and treating the resulting product with perchloric acid in acetic acid to cleave the bismethylenedioxy group.

4',11β,17α,21-tetrahydroxy - 20 - oxo[benzo-1',2':2,3-pregn-4-ene] [VI; R is COCH₂OH, X is (H)(OH), Z is OH, Y and Y' are CH₃], by condensing 2-hydroxymethylene-17,20;20,21-bis-methylenedioxy - 4 - pregnen-11β-ol-3-one with dimethyl acetonedicarboxylate, followed by saponifying and decarboxylating the intermediate 3',5'-dicarbomethoxy compound, and treating the resulting product with perchloric acid in acetic acid to cleave the bismethylenedioxy group.

4'-hydroxy - 4,4 - dimethyl - 20 - oxo[benzo-1',2':2,3-pregn-5-ene], by condensing 2-hydroxymethylene-4,4-dimethyl-pregn-5-ene-3,20-dione 20-monoethylene glycol ketal with dimethyl acetonedicarboxylate, followed by saponifying and decarboxylating the intermediate 3',5'-dicarbomethoxy compound, and heating the resulting product with dilute acetic acid to cleave the ketal group.

4'-hydroxy-6α-fluoro - 20 - oxo[benzo-1',2':2,3-pregn-4-ene], by condensing 2-hydroxymethylene-6α-fluoro-4-pregnene-3,20-dione 20-monoethylene glycol ketal with dimethyl acetonedicarboxylate, followed by saponifying and decarboxylating the intermediate 3',5'-dicarbomethoxy compound, and heating the resulting product with dilute acetic acid to cleave the ketal group.

4',17β - dihydroxy - 17α - methyl[benzo - 1',2':2,3 - 19-norandrosta-4,9-diene], by condensing 2-hydroxymethylene - 17α - methyl - 19 - nor - 4,9 - androstadien - 17β - ol-3-one with dimethyl acetonedicarboxylate, followed by saponifying and decarboxylating the intermediate 3',5'-dicarbomethoxy compound.

4',17β - dihydroxy - 7β,17α - dimethyl [benzo - 1',2':2,3-androst-4-ene], by condensing 2-hydroxymethylene-7β,17α-dimethyl-4-androsten-17β-ol-3-one with dimethyl acetonedicarboxylate, followed by saponifying and decarboxylating the intermediate 3',5'-dicarbomethoxy compound.

4',11β,17α,21 - tetrahydroxy - 5 - methyl[benzo - 1',2':2,3-pregnane], by condensing 2-hydroxymethylene-5-methyl - 17α,20;20,21 - bismethylenedioxypregnan - 11β - ol-3-one with dimethyl acetonedicarboxylate, followed by saponifying and decarboxylating the intermediate 3',5'-dicarbomethoxy compound.

4',9α,17β - trihydroxy[benzo - 1',2':2,3 - androstane], by condensing 2-hydroxymethylene-9α,17β-dihydroxyandrostan-3-one with dimethyl acetonedicarboxylate, followed by saponifying and decarboxylating the intermediate 3',5'-dicarbomethoxy compound.

4',11β,17α,21 - tetrahydroxy - 6β,9α - difluoro - 20 - oxo[benzo-1',2':2,3-pregn-4-ene], by condensing 2-hydroxymethylene - 17,20;20,21 - bismethylenedioxy - 6β,9α-difluoro-4-pregnen-11β-ol-3-one with dimethyl acetonedicarboxylate, followed by saponifying and decarboxylating the intermediate 3',5'-dicarbomethoxy compound, and treating the resulting product with perchloric acid in acetic acid to cleave the bismethylenedioxy group.

Also within the purview of the invention are benzo derivatives of D-homosteroids. The following such compounds can be prepared by procedures analogous to those described hereinabove:

4',17β - dihydroxy - 17α - methyl[benzo - 1',2':2,3 - D-homoandrostane], by condensing 2-hydroxymethylene-17α-methyl-D-homoandrostan-17β-ol-3-one with dimethyl acetonedicarboxylate, followed by saponifying and decarboxylating the intermediate 3',5'-dicarbomethoxy compound.

4',17β - dihydroxy[benzo - 1',2':2,3 - D - homoandrost-4-ene], by condensing 2-hydroxymethylene-D-homo-4-androsten-17β-ol-3-one with dimethyl acetonedicarboxylate, followed by saponifying and decarboxylating the intermediate 3',5'-dicarbomethoxy compound.

4',17β - dihydroxy - 17α - methyl[benzo - 1',2':2,3 - estra-1,3,5-triene] can be prepared by heating 4',17β-dihydroxy - 17α - methyl[benzo - 1',2':2,3 - 19 - nor - 4 - androstene] with palladium catalyst.

EXAMPLE 9

(a) 17α-Methyl-17β-Hydroxy-4'-Oxo-1',4',5',6'-Tetrahydro[Benzo-1',2':2,3-Androstane]

[X; R is CH₃]

A mixture of 15.23 g. (0.05 mole) of 17α-methylandrostan-17β-ol-3-one, 14.2 g. (0.20 mole) of pyrrolidine and 250 ml. of benzene was refluxed under a water separator until 1.3 ml. of water had been collected. The reaction mixture was concentrated in vacuo under nitrogen, 100 ml. of dioxane added to the residue and the mixture again concentrated. The residue was dissolved in 100 ml. of dioxane, placed in a nitrogen atmosphere, and there was added 7.00 g. (0.1 mole) of methyl vinyl ketone in 100 ml. of dioxane over a period of one-half hour. The mixture was kept at room temperature for two days under nitrogen and then concentrated to dryness in vacuo. To the residue was added 250 ml. of methanol, 40 g. of sodium acetate, 50 ml. of water and 40 ml. of acetic acid, and the mixture was refluxed for four hours under nitrogen and concentrated in vacuo. The residue was extracted with two 200 ml. portions of methylene dichloride, and the extracts were washed with 100 ml. of water, 100 ml. of saturated sodium bicarbonate solution, 100 ml. of water and 100 ml. of sodium chloride solution, dried over anhydrous sodium sulfate, filtered and concentrated. A chromatographic column was prepared from 500 g. of silica gel, and the crude product was added as a slurry in a solvent mixture containing 30% methylene dichloride, 20% ether and 50% pentane. The column was eluted with the same solvent mixture and then with a solvent mixture containing 30% methylene dichloride, 30% ether and 40% pentane. The latter brought out 4.40 g. of product which was dissolved in benzene and rechromatographed on 120 g. of neutral alumina. The product was eluted with benzene containing 10–25% of ether, and the resulting material was rechromatographed on 100 g. of silica gel in a solvent mixture containing 10% ether, 10% pentane and 80% methylene dichloride. The product was eluted with a solvent mixture containing 20% ether and 80% pentane, followed by gradually increasing proportions of ether. A solvent mixture of equal amounts of ether and pentane brought out the product which was recrystallized twice from ethyl acetate and dried for fifteen hours at 75° C. in vacuo to give 17α-methyl-17β-hydroxy-4'-oxo-1'4',5',6'-tetrahydro[benzo-1',2':2,3-androstane] in the form of colorless plates, M.P. 190.4–192.8° C. (corr.); ultraviolet maximum at 242 mμ $E=16,700$); infrared maxima at 2.94, 6.05 and 6.22μ.

(b) 17α - methyl - 17β - hydroxy - 4' - oxo - 1',4',5',6'- tetrahydro[benzo-1',3':2,3-androstane] can be aromatized by heating with palladium catalyst to give 4',17β- dihydroxy-17α-methyl[benzo-1',2':2,3-androstane], identical with the compound obtained above in Example 2, part (c).

I claim:

1. A 4'-hydroxy[benzo-1',2':2,3-steroid], the steroid moiety having from seventeen to about twenty-three carbon atoms exclusive of ester radicals and being selected from the group consisting of members of the estrane, 18-norestrane, androstane, etiocholane, pregnane and allopregnane series.

2. A compound selected from the group consisting of (A) compounds having the formula

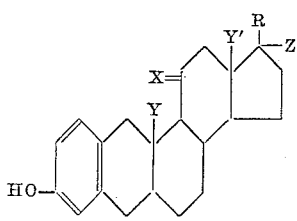

wherein R is a member of the group consisting of hydrogen, lower-alkyl, lower-alkenyl, lower-alkynyl, acetyl, hydroxyacetyl, 1,2-dihydroxyethyl and 1-hydroxyethyl; X is a member of the group consisting of $H_2$, (H)(OH) and O; Y and Y' are members of the group consisting of hydrogen and methyl; and Z is a member of the group consisting of hydrogen and hydroxy, Z being restricted to hydroxy when R is a member of the group consisting of hydrogen, lower-alkyl, lower-alkenyl and lower-alkynyl; (B) compounds of the above formula having a double bond in the 4,5-position; (C) compounds of the above formula having two double bonds, one in the 4,5-position and the other in the 6,7-position; and (D) carboxylic acid esters of (A), (B) and (C), the acyl moieties of said esters having from one to ten carbon atoms and having a molecular weight less than 200.

3. 4',17β-dihydroxy[benzo-1',2':2,3-androstane].

4. 4',17β - bis(β - cyclohexylpropionoxy)[benzo - 1', 2':2',3-androstane].

5. 4',17β - dihydroxy - 17α - methyl[benzo - 1',2':2,3 - androstane].

6. 4',17β - dihydroxy - 17α - methyl[benzo - 1',2':2,3 - androst-4-ene].

7. 4',17β - dihydroxy - 17α - methyl[benzo - 1',2':2,3 - androsta-4,6-diene].

8. 4',17β - dihydroxy - 17α - ethynyl[benzo - 1',2':2,3 - androst-4-ene].

9. 4',17α,21 - trihydroxy - 11,20 - dioxo[benzo - 1',2':2, 3-pregn-4-ene].

10. 4',20β-dihydroxy[benzo-1',2':2,3-pregn-4-ene].

11. 4'-hydroxy-20-oxo[benzo-1',2':2,3-pregn-4-ene].

12. A 3',5' - dicarbo - lower - alkoxy - 4' - hydroxy [benzo-1',2':2,3-steroid], the steroid moiety having from seventeen to about twenty-three carbon atoms exclusive of ester radicals and being selected from the group consisting of members of the estrane, 18-norestrane, androstane, etiochloane, pregnane and allopregnane series.

13. A 3',5' - dicarboxy - 4' - hydroxy[benzo - 1',2':2, 3-steroid], the steroid moiety having from seventeen to about twenty-three carbon atoms exclusive of ester radicals and being selected from the group consisting of members of the estrane, 18-norestrane, androstane, etiocholane, pregnane and allopregnane series.

14. A compound selected from the group consisting of (A) compounds having the formula

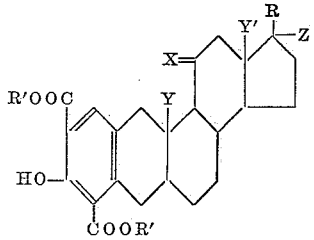

wherein R is a member of the group consisting of hydrogen, lower-alkyl, lower-alkenyl, lower-alkynyl, acetyl, hydroxyacetyl, 1,2-dihydroxyethyl and 1-hydroxyethyl; R' is lower-alkyl; X is a member of the group consisting of $H_2$, (H)(OH) and O; Y and Y' are members of the group consisting of hydrogen and methyl; and Z is a member of the group consisting of hydrogen and hydroxy, Z being restricted to hydroxy when R is a member of the group consisting of hydrogen, lower-alkyl, lower-alkenyl and lower-alkynyl; (B) compounds of the above formula having a double bond in the 4,5-position; and (C) compounds of the above formula having two double bonds, one in the 4,5-position and the other in the 6,7-position.

15. A compound selected from the group consisting of (A) compounds having the formula

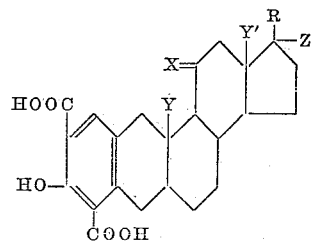

wherein R is a member of the group consisting of hydrogen, lower-alkyl, lower-alkenyl, lower-alkynyl, acetyl, hydroxyacetyl, 1,2-dihydroxyethyl and 1-hydroxyethyl; X is a member of the group consisting of $H_2$, (H)(OH) and O; Y and Y' are members of the group consisting of hydrogen and methyl; and Z is a member of the group consisting of hydrogen and hydroxy, Z being restricted to hydroxy when R is a member of the group consisting of hydrogen, lower-alkyl, lower-alkenyl and lower-alkynyl; (B) compounds of the above formula having a double bond in the 4,5-position; and (C) compounds of the above formula having two double bonds, one in the 4,5-position and the other in the 6,7-position.

16. 3',5' - dicarbomethoxy - 4',17β - dihydroxy[benzo - 1',2':2,3-androstane].

17. 3',5' - dicarboxy - 4',17β - dihydroxy[benzo - 1', 2': 2,3-androstane].

18. 3',5 - dicarboxy - 4',17β - dihydroxy - 17α - methyl [benzo-1',2':2,3-androstane].

19. 3',5' - dicarbomethoxy - 4',17β - dihydroxy - 17α - methyl[benzo-1',2':2,3-androst-4-ene].

20. 3',5' - dicarboxy - 4',17β - dihydroxy - 17α - methyl [benzo-1',2':2,3-androst-4-ene].

21. 3',5' - dicarboxy - 4',17β - dihydroxy - 17α - methyl [benzo-1',2':2,3-androsta-4,6-diene].

22. 3',5' - dicarboxy 4',17β - dihydroxy - 17α - ethynyl [benzo-1',2':2,3-androst-4-ene].

23. A compound having the formula

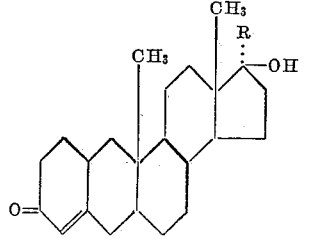

wherein R is lower-alkyl.

24. 17α - methyl - 17β - hydroxy - 4' - oxo - 1',4',5',6' - tetrahydro[benzo-1',2':2,3-androstane].

25. A process for preparing a 4'-hydroxy[benzo-1', 2':2,3-steroid] which comprises condensing a 2-hydroxymethylene-3-oxo-steroid with a di-lower-alkyl acetonedicarboxylate in the presence of a strong base, hydrolyzing the resulting 3',5'-dicarbo-lower-alkoxy-4'-hydroxy [benzo-1',2':2,3-steroid], and decarboxylating the 3',5'-dicarboxy - 4' - hydroxy[benzo - 1',2':2,3 - steroid] thus formed by heating it with a base, the steroid moiety having from seventeen to about twenty-three carbon atoms exclusive of ester radicals and being selected from the group consisting of members of the estrane, 18-norestrane, androstane, etiocholane, pregnane and allopregnane series.

26. A process for preparing a 3',5'-dicarbo-loweralkoxy-4'-hydroxy[benzo-1'2':2,3-steroid] which comprises condensing a 2-hydroxymethylene-3-oxo-steroid with a di-lower-alkyl acetonedicarboxylate in the presence of a strong base, the steroid moiety having from seventeen to about twenty-three carbon atoms exclusive of ester radicals and being selected from the group consisting of members of the estrane, 18-norestrane, androstane, etiocholane, pregnane and allopregnane series.

27. A process for preparing a 3',5'-dicarboxy-4'-hydroxy[benzo-1',2':2,3-steroid] which comprises hydrolyzing a 3',5' - dicarbo - lower - alkoxy - 4' - hydroxy[benzo-1',2':2,3-steroid], the steroid moiety having from seventeen to about twenty-three carbon atoms exclusive of ester radicals and being selected from the group consisting of members of the estrane, 18-norestrane, androstane, etiocholane, pregnane and allopregnane series.

28. A process for preparing a 4'-hydroxy[benzo-1', 2':2,3-steroid] which comprises decarboxylating a 3'5'-dicarboxy-4'-hydroxy[benzo-1',2':2,3-steroid], the steroid moiety having from seventeen to about twenty-three carbon atoms exclusive of ester radicals and being selected from the group consisting of members of the estrane, 18-norestrane, androstane, etiocholane, pregnane and appopregnane series.

29. A process for preparing a compound selected from the group consisting of (A) compounds having the formula

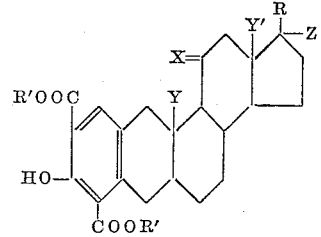

(B) compounds of the above formula having a double bond in the 4,5-position; and (C) compounds of the above formula having two double bonds, one in the 4,5-position and the other in the 6,7-position, which comprises condensing in the presence of a strong base a di-lower-alkyl acetonedicarboxylate with a compound selected from the group consisting of (A) compounds having the formula

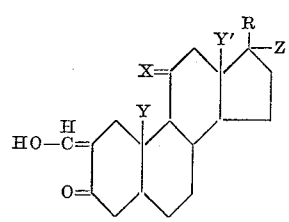

(B) compounds of the immediately above formula having a double bond in the 4,5-position; and (C) compounds of the immediately above formula having two double bonds, one in the 4,5-position and the other in the 6,7-position, wherein R is a member of the group consisting of hydrogen, lower-alkyl, lower-alkenyl, lower-alkynyl, acetyl, hydroxyacetyl, 1,2-dihydroxyethyl and 1-hydroxyethyl; R' is lower-alkyl; X is a member of the group consisting of $H_2$, (H)(OH) and O; Y and Y' are members of the group consisting of hydrogen and methyl; and Z is a member of the group consisting of hydrogen and hydroxy, Z being restricted to hydroxy when R is a member of the group consisting of hydrogen, lower-alkyl, lower-alkenyl and lower-alkynyl.

30. A process for preparing a compound selected from the group consisting of (A) compounds having the formula

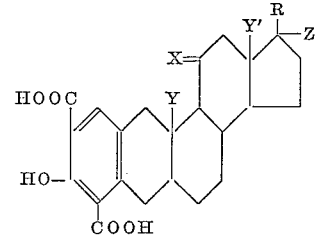

(B) compounds of the above formula having a double bond in the 4,5-position; and (C) compounds of the above formula having two double bonds, one in the 4,5-position and the other in the 6,7-position, which comprises hydrolyzing a compound selected from the group consisting of (A) compounds having the formula

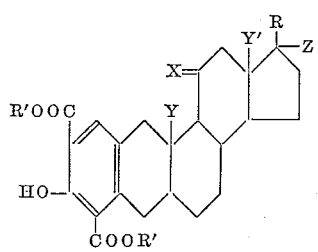

(B) compounds of the immediately above formula having a double bond in the 4,5-position; and (C) compounds of the immediately above formula having two double bonds, one in the 4,5-position and the other in the 6,7-position, wherein R is a member of the group consisting of hydrogen, lower-alkyl, lower-alkenyl, lower-alkynyl, acetyl, hydroxyacetyl, 1,2-dihydroxyethyl and 1-hydroxyethyl; R' is lower-alkyl; X is a member of the group consisting of $H_2$, (H)(OH) and O; Y and Y' are members of the group consisting of hydrogen and methyl; and Z is a member of the group consisting of hydrogen and hydroxy, Z being restricted to hydroxy when R is a member of the group consisting of hydrogen, lower-alkyl, lower-alkenyl and lower-alkynyl.

31. A process for preparing a compound selected from the group consisting of (A) compounds having the formula

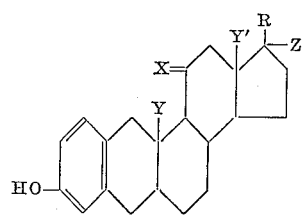

(B) compounds of the above formula having a double bond in the 4,5-position; and (C) compounds of the above formula having two double bonds, one in the 4,5-position and the other in the 6,7-position, which comprises decarboxylating a compound selected from the group consisting of (A) compounds having the formula

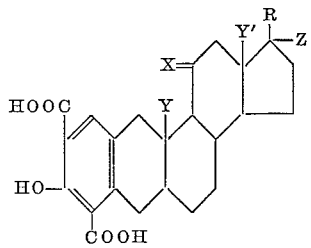

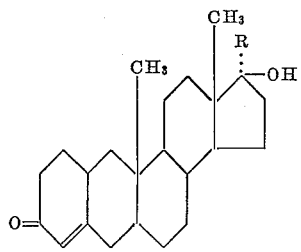

(B) compounds of the immediately above formula having a double bond in the 4,5-position; and (C) compounds of the immediately above formula having two double bonds, one in the 4,5-position and the other in the 6,7-position, wherein R is a member of the group consisting of hydrogen, lower-alkyl, lower-alkenyl, lower-alkynyl, acetyl, hydroxyacetyl, 1,2-dihydroxyethyl and 1-hydroxyethyl; X is a member of the group consisting of $H_2$, (H)(OH) and O; Y and Y' are members of the group consisting of hydrogen and methyl; and Z is a member of the group consisting of hydrogen and hydroxy, Z being restricted to hydroxy when R is a member of the group consisting of hydrogen, lower-alkyl, lower-alkenyl and lower-alkynyl.

32. A process according to claim 31 wherein the decarboxylation is carried out by heating in quinoline.

33. A process for preparing a compound having the formula which comprises treating with methyl vinyl ketone a compound having the formula

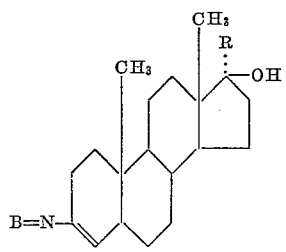

wherein B=N is tertiary-amino and R is lower-alkyl.

References Cited in the file of this patent
UNITED STATES PATENTS

| | | |
|---|---|---|
| 2,939,866 | Atwater | June 7, 1960 |
| 3,077,483 | Kincl | Feb. 12, 1963 |

OTHER REFERENCES

Cooley et al.: J.C.S. (London), September 1960, pages 3676–3678.

UNITED STATES PATENT OFFICE
CERTIFICATE OF CORRECTION

Patent No. 3,122,572            February 25, 1964

Raymond O. Clinton

It is hereby certified that error appears in the above numbered patent requiring correction and that the said Letters Patent should read as corrected below.

Column 1, line 68, for "$C_{23}$" read -- $C_{13}$ --; column 3, lines 45 to 54, formula VI should appear as shown below instead of as in the patent:

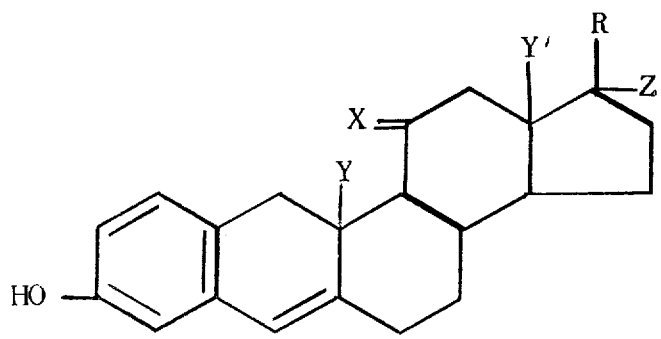

column 10, line 57, after "-1',2':2,3-" insert -- androst-5-ene], by condensing 2-hydroxymethylene-4,4, --; column 17, line 2, for "-1',3':" read -- -1',2': --; line 49, for "2',3-" read -- 2,3- --; column 18, line 54, for "3',5-" read -- 3',5'- --; column 19, lines 39 and 40, for "appopregnane" read -- allopregnane --.

Signed and sealed this 7th day of July 1964.

(SEAL)
Attest:

ERNEST W. SWIDER            EDWARD J. BRENNER

Attesting Officer            Commissioner of Patents